Oct. 28, 1952 — L. S. HAMER — 2,615,473
BLINDING DEVICE FOR PIPE LINES
Filed Jan. 20, 1947 — 2 SHEETS—SHEET 1
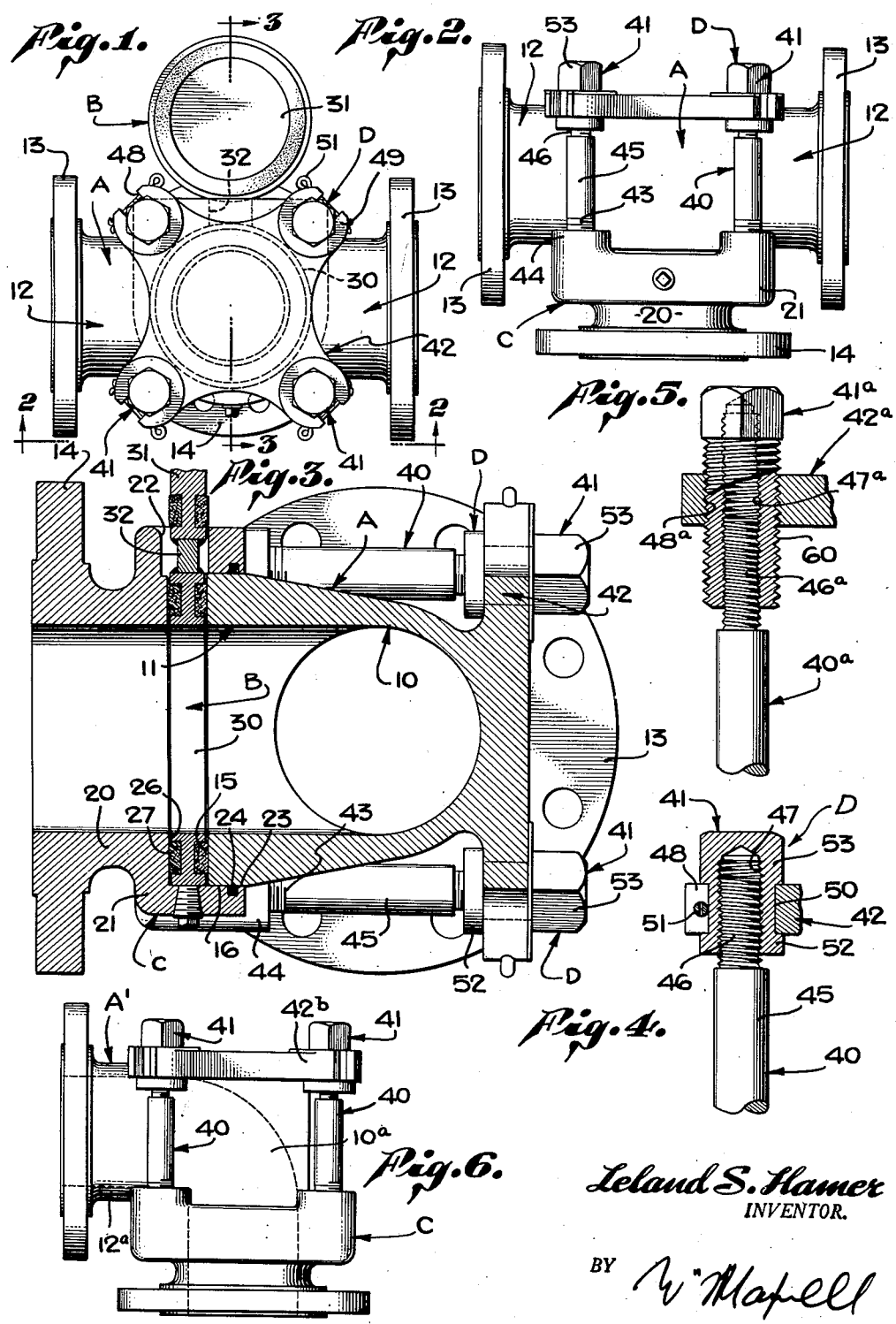
Leland S. Hamer
INVENTOR.
BY
ATTORNEY

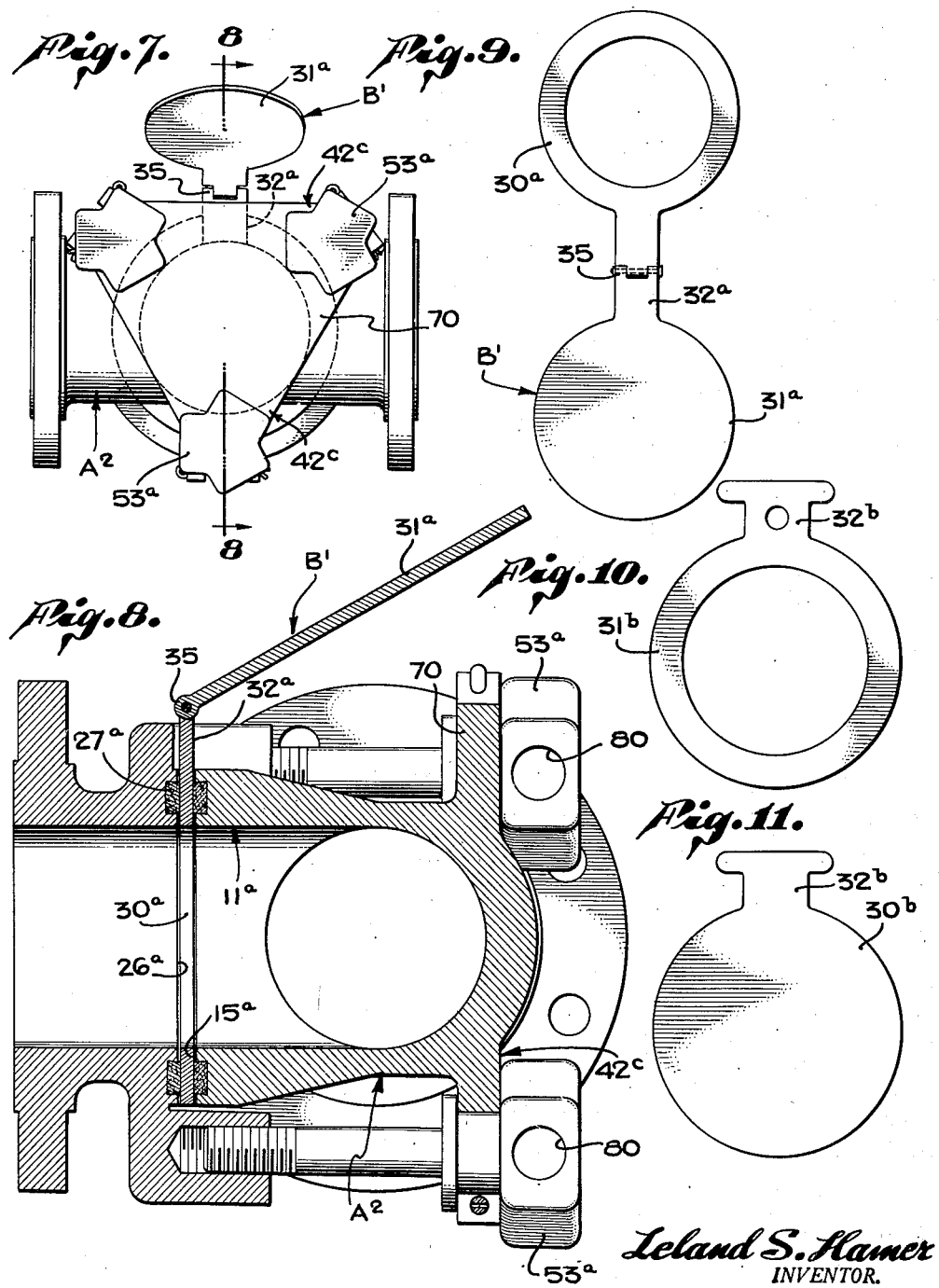

Patented Oct. 28, 1952

2,615,473

UNITED STATES PATENT OFFICE 2,615,473

BLINDING DEVICE FOR PIPE LINES

Leland S. Hamer, Long Beach, Calif., assignor of one-fourth to Paul A. Dewhirst, Los Angeles, Calif.

Application January 20, 1947, Serial No. 723,047

8 Claims. (Cl. 138—89)

This invention has to do with a blinding device for use in pipe lines, or the like, and it is a general object of the invention to provide a device involving a blinding plate and applicable to a pipe line in place of an ordinary or standard type of fitting.

A general object of the present invention is to provide a line blinding construction that can be advantageously incorporated in a structure that can be substituted for a standard type of pipe fitting, for instance, for a T-fitting or an L-fitting.

Another object of the present invention is to provide a pipe line fitting involving a body against which a plate is seated, a clamp engaging the plate to hold it against the body, and operating means coupling the clamp and body and operable to shift the clamp relative to the body. The operating means of the present invention involves few simple easily operated parts and includes nuts accessible at the side of the body opposite that where the clamp is located.

It is a further object of the present invention to provide a pipe line fitting of the general character referred to involving a simplified compact arrangement of parts enabling the structure to be used in a limited space and locating the operating means so that it is readily accessible for operation.

The various objects and features of my invention will be fully understood from the following detailed description of typical preferred forms and applications of the invention, throughout which description reference is made to the accompanying drawings, in which:

Fig. 1 is a side elevation of a typical pipe line T fitting incorporating the present invention, being a view taken at which I will term the back side of the fitting. Fig. 2 is a view of the structure shown in Fig. 1 taken as indicated by line 2—2 on Fig. 1. Fig. 3 is an enlarged detailed sectional view taken as indicated by line 3—3 on Fig. 1. Fig. 4 is an enlarged view taken at the nut of one unit of the operating means. Fig. 5 is a view similar to Fig. 4 showing a modified form of construction that can be employed in the operating means. Fig. 6 is a view showing my invention applied to an L fitting. Fig. 7 is a view similar to Fig. 1 showing a modified form of construction. Fig. 8 is an enlarged detailed sectional view of the structure shown in Fig. 7, being a view taken as indicated by line 8—8 on Fig. 7, and Figs. 9, 10 and 11 are views illustrating forms of plates that may be used in the structure that I have provided.

Referring to the form of the invention illustrated in Figs. 1, 2, 3 and 4 of the drawings the structure involves, generally, a body A, a flow handling plate B, a plate clamp C clamping the plate to the body, and operating means D coupling the plate to the body and operable to effect relative movement between the plate clamp and body.

The body A is a hollow or tubular structure and so far as my present invention is concerned it has a central or main portion 10 and a tubular projecting portion or outlet 11 projecting from and communicating with the main portion 10. The particular body A shown in Figs. 1, 2 and 3 of the drawings has an elongate main portion with aligned oppositely disposed end projections or outlets 12 provided at their outer ends with means for making connection with a pipe line, or the like. In the case illustrated I have shown pipe flanges 13 on the outer ends of the body parts 12. The lateral or side outlet 11 is located between the outlets 12 and projects laterally from the fitting. The outlet 11 of the body carries the plate clamp C so that it is a part of the fitting to which a pipe or the like can be connected. As shown in the drawings the outer end of the plate clamp is provided with a pipe flange 14. With this general arrangement of parts the structure that I have provided is in the nature of a T-fitting and my construction is such that the fitting can be made to correspond, generally, to a standard T-fitting so that it can be used in a pipe line or manifold in place of an ordinary T-fitting.

The lateral projection or outlet 11 of body A is tubular in form and has its outer end 15 finished to form a seat against which the plate B can be clamped. The exterior 16 of the outer end portion of body part 11 is turned and finished to form a guide on which the plate clamp C is supported.

The plate clamp C has a tubular portion 20 preferably corresponding in size with the body extension 11 to form an extension or continuation thereof. In accordance with my invention a chest 21 is provided at the inner end of the plate clamp C which chest is in the nature of an enlargement forming a chamber to carry the plate B so that it extends transversely of the passage or conduit formed by the parts 11 and 20. The chamber of chest 21 has a lateral access opening 22 through which the plate B can be introduced into operating position as shown in the drawings. A bore or opening 23 is provided in the chest from its outer end to slidably receive the guide portion of body part 11. In the preferred construction the bore 23 is made such as to slidably receive the body portion 16 to provide an effective bearing engagement between the clamp C and the body A. In practice a suitable packing 24 may be provided between these parts to prevent leakage. A seat 26 is provided in the chamber of the chest 21 opposing the seat 15 on the end of body part 11. When the plate B is in place it is arranged between the opposing faces 15 and 26 to be clamped therebetween when the clamp C is operated toward the body A. In practice I preferably provide packing 27 between the sides of the plate B and the faces 15 and 26, as clearly shown in the drawings.

In carrying out my present invention I may use any desired form or type of plate B in the structure that I have provided. In Figs. 1 and 3 of the drawings I show a double ended plate B which plate has an apertured end 30 shown arranged between the clamp C and body A and it has a blinding end in the form of an imperforate plate 31 which projects from the clamp and body when the apertured end 30 is in operating position. The plate portions 30 and 31 are coupled or joined by a neck 32 and the parts are such that the plate can be reversed end for end whenever desired.

In Figs. 7, 8 and 9 of the drawings I illustrate a plate B' having an apertured end 30ᵃ and an imperforate end 31ᵃ joined by a neck 32ᵃ which neck is provided with a hinge connection 35 which enables the plate portions to be folded or hinged so they lie in different planes, thus enabling the projecting portion of the plate to be folded down against the other parts of the fitting in the general manner illustrated in Figs. 7 and 8 of the drawings.

In Figs. 10 and 11 of the drawings I illustrate plate sections that are separate from each other, that is, in Fig. 10 I show an apertured plate section 31ᵇ provided with a stem 32ᵇ terminating in a handle so that it can be conveniently gripped by the operator. In Fig. 11 I show an imperforate plate 30ᵇ likewise provided with a stem 32ᵇ having a handle to facilitate operation.

The operating means D provided for operating the plate clamp C relative to the body A is a screw means involving a plurality of like units spaced around the assembly formed by the clamp C arranged on the outlet 11 of the body A. In the particular form of the invention under consideration there are four units of the means D equally spaced around the axis of the body outlet 11.

Each unit of means D involves a stud 40 fixed to the inner end of chest portion 21 of plate clamp C to project therefrom so that it overlies the main or middle portion 10 of body A, an operating nut 41 having threaded engagement with the stud 40 and a bracket or lug 42 projecting from the body A to carry the nut 41.

The stud 40 has its inner end 43 threaded and made fast in a boss 44 projecting from the inner end of chest 21 and it has a shank portion 45 of substantial length extending from the clamp C to the side of the fitting remote from that at which the clamp C is located. The outer end portion 46 of the stud is threaded to receive the operating nut 41. In the form of the invention illustrated in Figs. 1 to 4, inclusive, the operating nut 41 is carried by its supporting lug 42 so that it can be rotated but is held by the lug against axial movement. The nut has a central threaded opening 47 receiving the threaded end portion 46 of the stud 40 so that as the nut is rotated the stud and consequently the plate clamp C is shifted relative to the body, depending upon the direction in which the nut is rotated.

The lug 42 provided on the body A to carry nut 41 is in the nature of a projection on the body and in practice may be an integral part of the body, as shown throughout the drawings. In the preferred arrangement the lug 42 is located at the side of the main body portion 10 remote from that in which the tubular outlet 11 is located. The lug 42 illustrated in the drawings is provided with a notch 48 extending into it from its outer portion so that the lug is yoke shaped and has spaced side portions 49 between which the nut 41 is held. When this form of construction is employed the nut has a reduced turned shank portion 50 rotatably supported between the spaced sides 49 of the lug and a suitable retainer or key 51 extends between the outer ends of the side portions 49 to retain the nut in place. By providing the nut with a reduced shank portion 50 I provide it with a flange 52 at one end engaging one side of the lug and a head 53 at the other end engaging the other side of the lug. The head 53 is designed or shaped to receive a suitable operating tool. In the case illustrated it is shown polygonal in form and suitable for the reception of a wrench.

When the operating means D involves four units such as I have just described it is preferred to locate the units about 90° apart around the outlet 11 of the body which carries the clamp C and plate B so that two of the studs of the means D extend over the body portion 10 while the other two studs extend under the body portion 10. By proportioning the studs 40 so that they extend from the clamp C to the side of the body opposite to that from which the part 11 projects the operating nuts 41 on the studs are remote from the clamp C and are located at a point where they are free and unobstructed, making them readily accessible for operation. It will be observed from the drawings that the arrangement of parts just described is not only simple, but compact.

In the form of operating means illustrated in Fig. 5 of the drawings I provide a differential thread means. In this case the nut 41ᵃ instead of being merely rotatably carried by the supporting lug 42ᵃ is externally threaded as at 60 and is threaded into a bore or opening 48ᵃ extending through the lug 42ᵃ. The outer end portion 46ᵃ of the stud 40ᵃ is threaded into opening 47ᵃ in the nut. The threads inside the nut and at the outside of the nut are of corresponding pitch, that is, they are either both pitched to be lefthanded or to be righthanded, but are of different rates or of different numbers of threads for a given linear distance. Through this arrangement when the nut 41ᵃ is rotated there is but slight relative movement between the body A and the clamp C coupled to the stud 40ᵃ, with the result that a marked mechanical advantage is obtained, making it possible to clamp the plate between the clamp and the body with great force.

In the form of the invention illustrated in Fig. 6, the body A' is substantially the same as that above described except that the middle or main portion 10ᵃ is shaped somewhat differently since the body has but one side outlet or branch 12ᵃ making the fitting in the nature of an L as distinguished from a T. It is to be understood, of course, that the body portion 10ᵃ may be shaped or designed to properly carry the desired lugs 42ᵇ provided for carrying the operating nuts 41 on the studs 40 projecting from the plate clamp C.

In the form of the invention illustrated in Figs. 7 and 8 of the drawings the body A² is similar to that illustrated in Figs. 1, 2 and 3 of the drawings, except that at the side of the body opposite the tubular outlet 11ᵃ it is provided with a triangular flange-like part 70, the corner portions of which form lugs 42ᶜ similar, generally to the lugs 42 hereinabove described. In this form of the invention the operating means involves but three like units two of which are located at one side of the body, say for instance the upper side of the body, while the third is located at the other or lower side of the body. The structure illustrated in Figs. 7 and 8 is otherwise similar to that hereinabove described, except that the packing means 27ᵃ instead of being carried by the plate B is carried in the faces 15ᵃ and 26ᵃ and the plate B' is a sectional plain surfaced part. It is also to be noted that in Figs. 7 and 8, the heads 53ᵃ instead of being simple polygonal heads as above described are substantially triangular in shape having bar openings 80 for the reception of a suitable operating rod or bar, making the nuts easily operated by a simple bar or rod instead of by a wrench.

Having described only typical preferred forms and applications of my invention, I do not wish to be limited or restricted to the specific details herein set forth, but wish to reserve to myself any variations or modifications that may appear to those skilled in the art and fall within the scope of the following claims.

Having described my invention, I claim:

1. A fitting of the character described including, a body having a main portion and an outlet projecting from one side of said portion of the body and terminating at a clamp face, a clamp slidably engaged with the body and having a clamp face spaced from and opposing the face of the body, a plate adapted to be arranged in the space between the faces, and operating means connecting the clamp and body and including an operating nut accessible at the opposite side of said main portion of the body, a lug projecting from the body and supporting the nut, and means rotatably retaining the nut on the lug against axial movement relative thereto.

2. A fitting of the character described including, a body having a main portion and an outlet at one side and terminating at a clamp face, a clamp at the outlet slidably engaged with the body and having a clamp face spaced from and opposing the face of the body, a plate adapted to be arranged between the faces and operating means connecting the clamp and body including a plurality of individually operated members all located at the opposite side of the body.

3. A fitting of the character described including, a fluid handling body having a main portion and an outlet projecting laterally from one side of said main portion of the body, a clamp opposing and shiftable toward and away from the outer end of said outlet, the body and clamp defining a flow passage and a laterally opening plate chamber intersecting the passage, a blinding plate adapted to be moved laterally of the combined body and clamp into and out of the chamber and adapted to be normally located in the chamber between the clamp and said outlet, and operating means connecting the clamp and body to shift them relative to each other into and out of clamping engagement with the plate while holding them against separation and including an operating nut located opposite the clamp and beyond the opposite side of said main portion of the body, a lug projecting from the body and supporting the nut, and a member cooperating with the nut and extending therefrom to the clamp.

4. A fitting of the character described including, a flow handling body having an elongate main portion with an outlet at one end and with a laterally projecting elongate projection on one side of the main portion with an outlet opening and a plate seat around the outlet opening, a plate clamp slidably supported on the projection to shift bodily along the projection, the projection and clamp defining a flow passage and a laterally opening plate chamber intersecting the passage, a substantially flat line blinding plate adapted to be slid into and out of the chamber through the opening thereof and adapted to be clamped by the plate clamp to the seat, and a plurality of like units connecting the clamp and body against separation and for limited movement relative to each other to clamp or release the plate and each including, a stud fixed to and projecting from the clamp parallel with the projection and transversely of the main portion of the body in a direction normal to the first mentioned outlet, a nut threaded on the outer end portion of the stud at the opposite side of said main portion of the body, and a lug projecting from the main portion of the body at said opposite side thereof and supporting the nut.

5. A fitting of the character described including, a body having a main portion with an end outlet and with a tubular side outlet projecting laterally from one side of the main portion and a projecting lug at its opposite side, a plate clamp slidably mounted on the tubular side outlet and having a clamp face spaced from and opposing the terminal end of the side outlet, there being a lateral access opening in the clamp opposite the space between said face and the end of the side outlet, a blinding plate carried by the clamp to be movable through the access opening and adapted to be held tight against the terminal end of the side outlet by the face of the clamp, a stud carried by and projecting from the clamp and extending transversely across the main portion of the body, and a stud operating nut carried by the lug and threaded to the stud.

6. A fitting of the character described including, a body having a main portion with an end outlet and a tubular side outlet projecting laterally from one side of the main portion and having a finished end face, the body having a lug projecting from the opposite side of the main portion, a plate clamp slidably mounted on the tubular side outlet and having a finished clamp face spaced from and opposing the face of the side outlet, there being a laterally disposed access opening in the clamp communicating with the space between said faces, a substantially flat plate carried by the clamp and engaged through the access opening to be held between said faces, a stud rigid with and projecting from the clamp overlying the main portion of the body and extending transversely thereof, and a nut threaded to the lug and to the stud.

7. A fitting of the character described including, a body having a main portion with an end outlet and a tubular side outlet projecting from one side and having a finished end face, the body having a plurality of lugs projecting from the opposite side of the main portion, a plate clamp slidably mounted on the tubular side outlet and having a finished clamp face spaced from and opposing the face of the side outlet, there being a laterally disposed access opening in the clamp communicating with the space between said faces, a substantially flat plate carried by the clamp and engaged through the access opening to be held between said faces, studs projecting from the clamp to overlie opposite sides of the main portion of the body, and nuts carried by the lugs and having threaded engagement with the studs.

8. A T-fitting including, a body having an elongate main portion with opposite aligned end outlets with pipe flanges at their outer ends and a laterally projecting side outlet with a plate seat at its outer end, a plate clamp slidably carried on the side outlet and having a pipe flange at its outer end and a laterally opening plate carrying chest at its inner end slidably engaging the lateral outlet, a substantially flat line blinding plate adapted to slide into and out of the chest through the opening thereof and adapted to be carried by the chest in a position where it engages the seat, and means connecting the clamp and body against separation and operable to shift the clamp relative to the body to clamp or release the plate and including a plurality of operating units each with an individual tool receiving element at the opposite side of the body and located between the flanges on the end outlets.

LELAND S. HAMER.

REFERENCES CITED

The following references are of record in the file of this patent:

UNITED STATES PATENTS

| Number | Name | Date |
|---|---|---|
| 303,075 | Towne | Aug. 5, 1884 |
| 844,255 | Cramer | Feb. 12, 1907 |
| 1,120,861 | Thalman | Dec. 15, 1914 |
| 1,251,235 | Johnson | Dec. 25, 1917 |
| 1,298,173 | Cadman | Mar. 25, 1919 |
| 1,681,381 | Tolman | Aug. 21, 1928 |
| 1,841,789 | Connolly | Jan. 19, 1932 |
| 2,271,138 | Hamer | Jan. 27, 1942 |
| 2,339,970 | Young | Jan. 25, 1944 |
| 2,386,893 | Hamer | Oct. 16, 1945 |

FOREIGN PATENTS

| Number | Country | Date |
|---|---|---|
| 498,049 | France | of 1919 |
| 586,249 | Germany | of 1919 |